(12) United States Patent
Ohmori et al.

(10) Patent No.: US 7,501,165 B2
(45) Date of Patent: Mar. 10, 2009

(54) RETARDATION FILM, NOVEL POLYMER, OPTICAL FILM, AND IMAGE DISPLAY DEVICE

(75) Inventors: Yutaka Ohmori, Ibaraki (JP); Michie Sakamoto, Ibaraki (JP); Shuusaku Nakano, Ibaraki (JP); Takahisa Konishi, Ibaraki (JP); Seiji Umemoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 185 days.

(21) Appl. No.: 10/592,729

(22) PCT Filed: Jun. 3, 2005

(86) PCT No.: PCT/JP2005/010260
§ 371 (c)(1),
(2), (4) Date: Sep. 14, 2006

(87) PCT Pub. No.: WO2006/011298
PCT Pub. Date: Feb. 2, 2006

(65) Prior Publication Data
US 2008/0200621 A1     Aug. 21, 2008

(30) Foreign Application Priority Data
Jul. 29, 2004 (JP) .............................. 2004-221204
Sep. 14, 2004 (JP) .............................. 2004-266757

(51) Int. Cl.
*G02F 1/13363* (2006.01)
*C08G 10/06* (2006.01)

(52) U.S. Cl. ..................... 428/1.3; 525/330.3

(58) Field of Classification Search ........... 428/1.3; 525/330.3, 383, 386
See application file for complete search history.

(56) References Cited

U.S. PATENT DOCUMENTS
2,213,750 A * 9/1940 Swan .......................... 525/56

(Continued)

FOREIGN PATENT DOCUMENTS
JP     60-255805 A     12/1985

(Continued)

OTHER PUBLICATIONS

Striegel, Determining the vinyl alcohol distribution in a poly(vinyl butyral) using normal-phase gradient polymer elution chromatography, Journal of Chromatography A, 971, (2002) pp. 151-158.*

(Continued)

*Primary Examiner*—Keith D Hendricks
*Assistant Examiner*—Sophie Hon
(74) *Attorney, Agent, or Firm*—Westerman, Hattori, Daniels & Adrian, LLP.

(57) ABSTRACT

A retardation film according to the present invention consists of a single-layer film in which a birefringent chain polymer is oriented, the polymer having as a repeating unit (A), a structure represented by the following general formula (V):

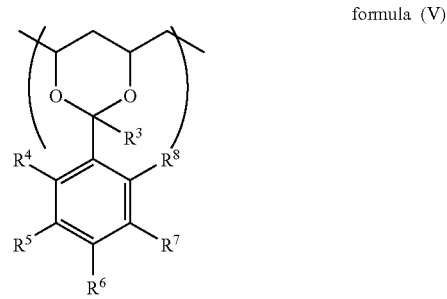

formula (V)

wherein $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group (where $R^4$ and $R^8$ are not simultaneously hydrogen atoms); and $R^5$, $R^6$, and $R^7$ each independently represent a hydrogen atom or a substituent.

17 Claims, 1 Drawing Sheet

U.S. PATENT DOCUMENTS

| | | | | |
|---|---|---|---|---|
| 3,084,989 | A * | 4/1963 | Abe et al. | 8/115.64 |
| 4,743,409 | A * | 5/1988 | Nomura et al. | 264/1.33 |
| 5,343,317 | A * | 8/1994 | Wada et al. | 349/119 |
| 6,277,750 | B1 | 8/2001 | Pawlowski et al. | |
| 2003/0130435 | A1 * | 7/2003 | Tanaka et al. | 525/330.3 |

FOREIGN PATENT DOCUMENTS

| | | |
|---|---|---|
| JP | 61-42507 A | 3/1986 |
| JP | 6-122713 A | 5/1994 |
| JP | 6-192326 A | 7/1994 |
| JP | 10-140122 A | 5/1998 |
| JP | 2003-313230 A | 11/2003 |
| WO | WO 00/03303 A1 | 1/2000 |

OTHER PUBLICATIONS

International Search Report mailed Sep. 13, 2005 of International Application PCT/JP2005/010260.

* cited by examiner

Fig. 1

RETARDATION FILM, NOVEL POLYMER, OPTICAL FILM, AND IMAGE DISPLAY DEVICE

TECHNICAL FIELD

The present invention relates to a retardation film, a novel polymer, an optical film using the retardation film, and an image display device.

BACKGROUND ART

Retardation films are optical members to be used for obtaining various kinds of polarized light such as linearly polarized light, circularly polarized light, and elliptically polarized light. As such retardation films, a $\lambda/4$ plate whose retardation is ¼ of a wavelength $\lambda$ and a $\lambda/2$ plate whose retardation is ½ of a wavelength $\lambda$ are known. The $\lambda/4$ plate has an optical function of converting linearly polarized light to circularly polarized light, and the $\lambda/2$ plate has an optical function of rotating the plane of polarization of linearly polarized light by 90°. Generally, such retardation films designed to act as a $\lambda/4$ plate or a $\lambda/2$ plate for light having a specific wavelength cannot perform the same function for light having any other wavelength. For example, a retardation film designed to act as a $\lambda/4$ plate for light having a wavelength of 550 nm cannot perform the same function for light having a wavelength of 450 nm or 650 nm. That is, retardation films generally exhibit wavelength dispersion characteristics such that the retardation thereof depends on wavelength. For example, it is generally known that a polymer film exhibits wavelength dispersion characteristics such that the retardation thereof is larger at a shorter wavelength and is smaller at a longer wavelength.

When white light being a composite of various wavelengths of visible light rays enters a retardation film exhibiting such wavelength dispersion characteristics, the wavelength dispersion characteristics cause a problem that the form of polarization of light rays greatly varies depending on their respective wavelengths and therefore distribution of polarization state occurs, so that the incident white light is converted to colored light.

In order to overcome such a problem, Japanese Patent Laid-open No. Hei 10-239518 has proposed a retardation film having a wavelength dispersion value $\alpha$ of less than 1, which is obtained by laminating together two or more birefringent media having different wavelength dispersion values $\alpha(\alpha=\Delta n (450 \text{ nm})/\Delta n(650 \text{ nm}))$ in such a manner that their slow axes intersect at right angles. Japanese Patent Laid-open No. Hei 10-239518 describes that such a retardation film has the effect of giving a constant optical retardation to any wavelength lying within a visible light wavelength range (that is, such a retardation film provides a constant optical retardation irrespective of wavelength) so that white light can be easily obtained.

However, since the retardation film disclosed in Japanese Patent Laid-open No. Hei 10-239518 is a laminated product comprising two or more birefringent media, it requires a process for laminating these birefringent media and bonding them together. In addition to that, it is also necessary to select two or more birefringent materials and an adhesive for bonding two or more birefringent media. Further, since such a retardation film having a laminate structure becomes relatively thick, it is not suitable for use in, for example, liquid crystal displays required to be smaller in thickness.

It is therefore an object of the present invention to provide a retardation film which can be relatively small in thickness and which exhibits wavelength dispersion characteristics such that retardation for light having a wavelength of $\lambda$ lying within almost the entire visible light wavelength range from 400 to 700 nm is about $\lambda/2$ or $\lambda/4$, a novel polymer that can be suitably used as a material for forming such a retardation film, an optical film, and an image display device.

DISCLOSURE OF THE INVENTION

The present inventors have intensively studied various materials to solve the problems described above, and as a result, they have found that the problems can be solved by using a chain polymer obtained by introducing a specific side chain into a main chain.

In order to achieve the above object, the present invention provides a retardation film (1) consisting of a single-layer film in which a birefringent chain polymer is oriented, the chain polymer having as a side chain (a), a group represented by the following general formula (I):

formula (I)

wherein two oxygen atoms are bonded to atoms constituting a main chain, respectively; and $R^1$ and $R^2$ each independently represent a hydrogen atom, an alkyl group having 1 to 8 carbon atoms, or an aromatic group (where at least either $R^1$ or $R^2$ is an aromatic group, and the aromatic group(s) represented by $R^1$ or/and $R^2$ is (are) arranged in a direction such that the planar structure thereof is substantially orthogonal to a virtual line obtained by connecting the two oxygen atoms).

As described above, the retardation film of the present invention is consisted of a single-layer film, and therefore can be smaller in thickness than a conventional retardation film. Further, this retardation film gives a retardation of, for example, about $\lambda/2$ or $\lambda/4$ to light having a wavelength of $\lambda$ lying within almost the entire visible light wavelength range from 400 to 700 nm, thereby providing substantially the same form of polarization at any wavelength from 400 to 700 nm. Therefore, even when white light enters this retardation film, the white light is not converted to colored polarized light, that is, white polarized light is obtained.

The present invention also provides a retardation film (2) consisting of a single-layer film in which a birefringent chain polymer is oriented, the polymer having as a side chain (a), at least either a group represented by the following general formula (II) or a group represented by the following general formula (III):

formula (II)

wherein two oxygen atoms are bonded to atoms constituting a main chain, respectively; $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group (where $R^4$ and $R^8$ are not simultaneously hydrogen atoms); and $R^5$, $R^6$, and $R^7$ each independently represent a hydrogen atom or a substituent, formula (III)

wherein two oxygen atoms are bonded to atoms constituting a main chain, respectively; $R^3$ represents a hydrogen atom or an alkyl group having 1 to 8 carbon atoms; and A represents a naphthyl group which may have a substituent, an anthranyl group which may have a substituent, or a phenanthrenyl group which may have a substituent (where one or more carbon atoms constituting the naphthyl, anthranyl, or phenanthrenyl group may be substituted by one or more nitrogen atoms).

The present invention also provides a retardation film (3) according to (1) or (2) described above, wherein the polymer has a part where structural units each having a structure, in which the side chain (a) is bonded to constituent atoms of the main chain of the polymer, are adjacent to each other.

The present invention also provides a retardation film (4) according to any one of (1) to (3) described above, which has a smaller in-plane retardation at a shorter wavelength lying within a range of at least 450 to 650 nm, and has a larger in-plane retardation at a longer wavelength lying within a range of at least 450 to 650 nm.

The present invention also provides a retardation film (5) according to any one of (1) to (4) described above, wherein the amount of the side chain (a) contained in the polymer is 1 to 50 mol % with respect to the total amount of side chains of the polymer.

The present invention also provides a retardation film (6) according to any one of (1) to (5) described above, wherein the polymer has, in addition to the side chain (a), a hydroxyl group as a side chain (b).

The present invention also provides a retardation film (7) according to (6) described above, wherein the polymer has, in addition to the side chains (a) and (b), a group represented by the following general formula (IV) as a side chain (c):

formula (IV)

wherein $R^9$ represents a hydrogen atom or a linear, branched or cyclic alkyl group (where one or more carbon atoms of the alkyl group may be substituted by one or two or more non-adjacent oxygen atoms).

The present invention also provides a retardation film (8) according to (7) described above, wherein the amount of the side chain (a), the amount of the side chain (b), and the amount of the side chain (c) contained in the polymer are 1 to 50 mol %, 5 to 95 mol %, and 1 to 90 mol %, respectively, with respect to the total amount of side chains of the polymer.

The present invention also provides a retardation film (9) consisting of a single-layer film in which a birefringent chain polymer is oriented, the polymer having as a repeating unit (A), at least either a structure represented by the following general formula (V) or a structure represented by the following general formula (VI):

formula (V)

wherein $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group (where $R^4$ and $R^8$ are not simultaneously hydrogen atoms); and $R^5$, $R^6$, and $R^7$ each independently represent a hydrogen atom or a substituent, formula (VI)

wherein $R^3$ represents a hydrogen atom or an alkyl group having 1 to 8 carbon atoms; and A represents a naphthyl group which may have a substituent, an anthranyl group which may have a substituent, or a phenanthrenyl group which may have a substituent (where one or more carbon atoms constituting the naphthyl, anthranyl, or phenanthrenyl group may be substituted by one or more nitrogen atoms).

The present invention also provides a retardation film (10) according to (9) described above, wherein the repeating unit (A) of the polymer is obtained by acetalization of hydroxyl groups of polyvinyl alcohol with aromatic aldehyde.

The present invention also provides a retardation film (11) according to (9) or (10) described above, wherein the polymer has, in addition to the repeating unit (A), a repeating unit (B) represented by the following general formula (VII), and wherein the repeating units (A) and (B) may be arranged in either block or random fashion:

formula (VII)

The present invention also provides a retardation film (12) according to (11) described above, wherein the polymer has, in addition to the repeating units (A) and (B), a repeating unit (C) represented by the following general formula (VIII), and wherein the repeating units (A) to (C) may be arranged in either block or random fashion:

formula (VIII)

wherein $R^9$ represents a hydrogen atom or a linear, branched, or cyclic alkyl group having 1 to 12 carbon atoms (where one or more carbon atoms of the alkyl group may be substituted by one or two or more non-adjacent oxygen atoms).

The present invention also provides a retardation film (13) consisting of a single-layer film in which a birefringent chain polymer is oriented, the polymer having a structure represented by the following general formula (IX):

formula (IX)

wherein l is 5 to 30 mol %, m is 20 to 80 mol %, and n is 1 to 70 mol %.

The present invention also provides a retardation film (14) consisting of a single-layer film in which a birefringent chain polymer is oriented, the polymer having a structure represented by the following general formula (X):

formula (X)

wherein l is 5 to 30 mol %, m is 20 to 80 mol %, and n is 1 to 70 mol %.

The present invention also provides a polymer comprising a repeating unit represented by the following general formula (V'):

formula (V')

wherein $R^3$ represents a hydrogen atom or an alkyl group having 1 to 8 carbon atoms; $R^4$ and $R^8$ each independently represent a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group; and $R^5$, $R^6$, and $R^7$ each independently represent a hydrogen atom or a substituent.

The present invention also provides a polymer comprising a repeating unit represented by the general formula (V') and a repeating unit represented by the following general formula (VIII), the repeating units being arranged in either block or random fashion:

formula (VIII)

wherein $R^9$ represents a hydrogen atom or a linear, branched, or cyclic alkyl group having 1 to 12 carbon atoms (where one or more carbon atoms of the alkyl group may be substituted by one or two or more non-adjacent oxygen atoms).

In the polymer having a repeating unit represented by the general formula (V'), it is preferred that $R^4$ and $R^8$ are each independently a linear or branched alkyl group having 1 to 4 carbon atoms or a chlorine atom.

Further, in the polymer having a repeating unit represented by the general formula (V'), it is also preferred that $R^3$, $R^5$, and $R^7$ are each a hydrogen atom and $R^4$ and $R^8$ are each a methyl group.

The present invention also provides a polymer represented by the following general formula (IX):

formula (IX)

wherein l is 5 to 30 mol %, m is 20 to 80 mol %, and n is 1 to 70 mol %.

The present invention also provides a polymer represented by the following general formula (X):

formula (X)

wherein l is 5 to 30 mol %, m is 20 to 80 mol %, and n is 1 to 70 mol %.

The present invention also provides a polymer represented by the following general formula (XI):

formula (XI)

wherein l is 5 to 30 mol %, m is 20 to 80 mol %, and n is 1 to 70 mol %.

The present invention also provides a polymer represented by the following general formula (XII):

formula (XII)

wherein l is 5 to 30 mol %, m is 20 to 60 mol %, n is 20 to 60 mol %, and o is 1 to 55 mol %.

The present invention also provides an optical film (15) having a laminate structure comprising the retardation film according to any one of (1) to (14) described above.

The present invention also provides an image display device comprising the retardation film according to any one of (1) to (14) described above or the optical film (15) described above.

BEST MODE FOR CARRYING OUT THE INVENTION

The present inventors have found that a single-layer film in which a chain polymer having a side chain (a), in which an aromatic group is introduced into —OCO—, is oriented has a smaller in-plane retardation at a shorter wavelength lying within a visible light wavelength range of at least 450 to 650 nm. The present invention entirely utilizes such characteristics of the single-layer film to provide a retardation film having a relatively small thickness and exhibiting a predetermined retardation at wavelengths lying in almost the entire visible light wavelength range of 400 to 700 nm, and a novel polymer which can be suitably used for forming such a retardation film.

Hereinbelow, the present invention will be described more specifically. It is to be noted that in this specification, the characteristics of the retardation film of the present invention such that the in-plane retardation thereof is smaller at a shorter wavelength lying within a visible light wavelength range is also referred to as "reverse wavelength dispersion characteristics".

The present invention provides a retardation film consisting of a single-layer film in which a birefringent chain polymer is oriented, the polymer having as a side chain (a), a group represented by the following general formula (I):

formula (I)

wherein two oxygen atoms are bonded to atoms constituting a main chain, respectively; and $R^1$ and $R^2$ each independently represent a hydrogen atom, an alkyl group having 1 to 8 carbon atoms, or an aromatic group (where at least either $R^1$ or $R^2$ is an aromatic group, and the aromatic group(s) represented by $R^1$ or/and $R^2$ is (are) arranged in a direction such that the planar structure thereof is substantially orthogonal to a virtual line obtained by connecting the two oxygen atoms).

Here, the chain polymer to be used in the present invention is a polymer having a linear main chain, and may partially have a short branched chain. Generally, the orientation of a chain polymer is given by drawing a film. Therefore, it can be said that in the case of uniaxial drawing, the orientation direction of the polymer is equal to a direction in which the film is drawn, and that in the case of biaxial drawing, the orientation direction of the polymer is equal to a direction in which the film is mainly drawn.

Further, the term "two oxygen atoms are bonded to atoms constituting a main chain, respectively" described with reference to the side chain (a) means that one oxygen atom is bonded to one atom constituting a main chain and the other oxygen atom is bonded to another atom constituting a main chain. The term "aromatic group" means an aromatic compound group having π electrons arranged in a planar cyclic array. Examples of such an aromatic group include a benzene ring, compounds obtained by condensing two or more benzene rings, and heteroaromatic compounds containing an atom other than carbon. The term "the aromatic group(s) is (are) arranged in a direction such that the planar structure thereof is substantially orthogonal to a virtual line obtained by connecting the two oxygen atoms" means that in a case where a virtual line is created by connecting the two oxygen atoms, the aromatic group(s) is (are) arranged in such a manner that a line parallel to the virtual line is substantially orthogonal to the planar structure of the aromatic group(s). That is, the term does not mean that the virtual line itself obtained by connecting the two oxygen atoms intersects with the planar structure of the aromatic group(s).

When the polymer is oriented, two oxygen atoms are arranged along a direction in which the main chain of the polymer is oriented. As described above, in the polymer, the aromatic group(s) of the side chain (a) is (are) arranged in a direction substantially orthogonal to a virtual line obtained by connecting the two oxygen atoms. That is, the planar structure of the aromatic group(s) is arranged in a direction substantially orthogonal to a direction in which the main chain of the polymer is oriented (where it can be considered that the planar structure of the aromatic group(s) of the side chain (a) is not accurately arranged at 90° to a direction in which the main chain of the polymer is oriented, and is in fact arranged at about 75 to 105° to a direction in which the main chain of the polymer is oriented). It can be considered that the existence of the side chain (a) arranged in such a manner described above allows the retardation film of the present invention to have wavelength dispersion characteristics reverse to those of a retardation film formed of a conventional polymer, that is, wavelength dispersion characteristics such that the in-plane retardation thereof is smaller at a shorter wavelength lying within a visible light wavelength range, and is larger at a longer wavelength lying within a visible light wavelength range.

Specific examples of an alkyl group having 1 to 8 carbon atoms represented by $R^1$ or $R^2$ in the general formula (I) include methyl, ethyl, n-propyl, isopropyl, n-butyl, isobutyl, sec-butyl, t-butyl, n-pentyl, isopentyl, n-hexyl, and 2-ethyl hexyl groups.

Examples of the side chain (a) represented by the general formula (I) in which either $R^1$ or $R^2$ is an aromatic group include those represented by the following general formulas (II) and (III):

formula (II)

wherein two oxygen atoms are bonded to atoms constituting a main chain, respectively; $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group (where $R^4$ and $R^8$ are not simultaneously hydrogen atoms); and $R^5$, $R^6$, and $R^7$ each independently represent a hydrogen atom or a substituent, formula (III)

wherein two oxygen atoms are bonded to atoms constituting a main chain, respectively; $R^3$ represents a hydrogen atom or an alkyl group having 1 to 8 carbon atoms; and A represents a naphthyl group which may have a substituent, an anthranyl group which may have a substituent, or a phenanthrenyl group which may have a substituent (where one or more carbon atoms constituting the naphthyl, anthranyl, or phenanthrenyl group may be substituted by one or more nitrogen atoms).

As described above, in the side chain (a) having a structure represented by the general formula (II), $R^4$ and $R^8$ in the ortho position of the benzene ring are not simultaneously hydrogen atoms, and at least either $R^4$ or $R^8$ is substituted by a substituent such as an alkyl group. Such introduction of a substituent(s) in the ortho position causes larger steric hindrance between the substituent(s) and the oxygen atoms. As a result, the substituent(s) is (are) arranged between the two oxygen atoms. This can be regarded as the reason why the side chain (a) represented by the general formula (II) is arranged in a direction such that the planar structure of the benzene ring thereof is substantially orthogonal to a virtual line obtained by connecting the two oxygen atoms.

Further, as described above, the side chain (a) represented by the general formula (III) has an aromatic group in which two or more benzene rings are condensed. Such a condensed ring aromatic group is sterically bulky due to a benzene ring(s) condensed to a benzene ring bonded to —OCO—, thereby causing larger steric hindrance between the condensed ring aromatic group and the oxygen atoms. This can be regarded as the reason why the side chain (a) represented by the general formula (III) is arranged in a direction such that the planar structure of the aromatic group thereof is substantially orthogonal to a virtual line obtained by connecting the two oxygen atoms.

Specific examples of an alkyl group having 1 to 8 carbon atoms represented by $R^3$ in the general formula (II) include methyl, ethyl, n-propyl, isopropyl, n-butyl, isobutyl, sec-butyl, t-butyl, n-pentyl, isopentyl, n-hexyl, 2-ethyl hexyl groups. Specific examples of an alkyl group having 1 to 4 carbon atoms represented by $R^4$ and $R^8$ in the general formula (II) include methyl, ethyl, n-propyl, isopropyl, n-butyl, isobutyl, sec-butyl, and t-butyl groups. Specific examples of an alkoxyl group having 1 to 4 carbon atoms represented by $R^4$ and $R^8$ in the general formula (II) include methoxy, ethoxy, n-propoxy, isopropoxy, n-butoxy, and isobutoxy groups. Examples of a substituent represented by $R^5$, $R^6$, and $R^7$ in the general formula (II) include those mentioned below as substituents in A in the general formula (III).

In the side chain (a) represented by the general formula (II), $R^3$ is preferably a hydrogen atom (which is sterically small) because the planar structure of the aromatic group is easily arranged in a direction substantially orthogonal to a virtual line obtained by connecting the two oxygen atoms, due to steric hindrance between the substituent(s) in the ortho position and the oxygen atoms. Particularly, it is preferred that in the side chain (a) represented by the general formula (II), $R^3$ is a hydrogen atom, and $R^4$ and $R^8$ are each independently a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group (that is, neither $R^4$ nor $R^8$ is a hydrogen atom), because the planar structure of the aromatic group is more easily arranged in a direction substantially orthogonal to a virtual line obtained by connecting the two oxygen atoms. It is more preferred that in the side chain (a) represented by the general formula (II), $R^3$ is a hydrogen atom, and $R^4$ and $R^8$ are each independently a linear or branched alkyl group having 1 to 4 carbon atoms, a linear or branched alkoxyl group having 1 to 4 carbon atoms, or halogen. In addition to the reason described above, from the viewpoint of ease of introduction of an acetal structure and stability of the acetal structure, it is particularly preferred that in the side chain (a) represented by the general formula (II), $R^3$, $R^5$, and $R^7$ are each a hydrogen atom, and $R^4$, $R^6$, and $R^8$ are each a methyl group.

In a case where a naphthyl, anthranyl, or phenanthrenyl group represented by A in the general formula (III) has a substituent, the substituent is not particularly limited. Examples of such a substituent include a linear or branched alkyl or alkoxyl group having 1 to 8 carbon atoms, a cycloalkyl or cycloalkoxyl group having 3 to 6 carbon atoms, a hydroxyl group, a carboxyl group, an amino group, halogen, a nitro group, a thiol group, an aldehyde group, a cyano group, or a sulfonic acid group. The number of such substituents in the naphthyl, anthranyl, or phenanthrenyl group represented by A may be one or two or more. In a case where two or more substituents are present in the naphthyl, anthranyl, or phenanthrenyl group represented by A, these substituents are the same or different.

In the side chain (a) represented by the general formula (III), A is preferably a 9-anthranyl group which may have a substituent because the planar structure of the benzene rings of the 9-anthranyl group is easily arranged in a direction substantially orthogonal to a virtual line obtained by connecting the two oxygen atoms, due to steric hindrance between the benzene rings and the oxygen atoms. It is to be noted that the term "which may have a substituent" means that the group is non-substituted or substituted by one or more substituents.

An example of the side chain (a) represented by the general formula (I) in which $R^1$ and $R^2$ are both aromatic groups includes one represented by the following general formula (XIII):

formula (XIII)

wherein $R^{10}$ to $R^{19}$ each independently represent a hydrogen atom or a linear or branched alkyl group having 1 to 4 carbon atoms (where $R^{10}$ and $R^{14}$ are not simultaneously hydrogen atoms and $R^{15}$ and $R^{19}$ are not simultaneously hydrogen atoms); and two benzene rings may be partially bonded together through a single bond.

Specific examples of the side chain (a) represented by the general formula (XIII) include those having a structure represented by the following formula (XIV):

formula (XIV)

The polymer of the present invention should have at least any one of the groups mentioned above as the side chain (a) to be bonded to the main chain thereof. For example, the polymer of the present invention may have, as the side chain (a), both the groups represented by the general formulas (II) and (III) bonded to the main chain thereof.

From the viewpoint of enabling the retardation film of the present invention to reliably exhibit reverse wavelength dispersion characteristics, the amount of the side chain (a) to be introduced into the main chain of the polymer is preferably 1 mol % or more, more preferably 5 mol % or more, with respect to the total amount of side chains of the polymer. Further, from the viewpoint of enabling the retardation film of the present invention to have a positive birefringence anisotropy, the amount of the side chain (a) to be introduced into the main chain of the polymer is preferably 50 mol % or less, more preferably 30 mol % or less, with respect to the total amount of side chains of the polymer.

As described above, the chain polymer to be used for the retardation film of the present invention has the side chain (a), but may further have a side chain other than the side chain (a). Examples of such a side chain include, but are not limited to, a hydroxyl group, an amino group, a thiol group, an alkoxyl group, halogen, a cyano group, a nitro group, an ester group, a ketone group, an aldehyde group, an amide group, a urethane group, a urea group, a carbonate group, and a group represented by the following general formula (IV):

formula (IV)

wherein $R^9$ represents a hydrogen atom or a linear, branched or cyclic alkyl group (where one or more carbon atoms of the alkyl group may be substituted by one or two or more non-adjacent oxygen atoms).

Among these side chains other than the side chain (a), from the viewpoint of improving reverse wavelength dispersion characteristics and solubility of the chain polymer in a solvent used for film formation, the chain polymer to be used for the retardation film of the present invention preferably has a hydroxyl group as a side chain (b) other than the side chain (a).

Further, from the viewpoint of improving transparency and decreasing glass transition temperature, the chain polymer to be used for the retardation film of the present invention preferably has a group represented by the general formula (IV) as a side chain (c) other than the side chain (a). Among the groups represented by the general formula (IV), at least one selected from groups represented by the general formula (IV) in which $R^9$ is a hydrogen atom or a linear, branched or cyclic alkyl group having 1 to 12 carbon atoms (where one or more carbon atoms of the alkyl group may be substituted by one or two or more non-adjacent oxygen atoms) is preferably introduced as a side chain (c) into the main chain of the chain polymer. Among such groups, a group represented by the following formula (XV) is more preferred:

formula (XV)

The amount of the side chain (b) and/or the side chain (c) to be introduced into the main chain of the chain polymer can be appropriately adjusted within the range of the remaining amount after deduction of the amount of the side chain (a) in view of desired characteristics of the retardation film. However, from the viewpoint of improving reverse wavelength dispersion characteristics and the solubility of the chain polymer in a solvent, the amount of a hydroxyl group as the side chain (b) is preferably 5 mol % or more, more preferably 20 mol % or more, with respect to the total amount of side chains of the chain polymer. The upper limit amount of the side chain (b) is appropriately adjusted depending on the amount of the side chain (a) and the side chain (c), but is preferably about 95 mol % or less, more preferably about 80 mol % or less. Further, from the viewpoint of improving transparency, the amount of the side chain (c) to be introduced into the main chain of the chain polymer is preferably 1 mol % or more, more preferably 5 mol % or more, with respect to the total amount of side chains of the chain polymer. The upper limit amount of the side chain (c) is preferably about 90 mol % or less, more preferably about 50 mol % or less.

As described above, the chain polymer to be used for the retardation film of the present invention has the side chain (a) and, if necessary, the side chain (b) and/or the side chain (c) other than the side chain (a). The main chain of the chain polymer is not particularly limited, and can have any structure as long as it exhibits birefringence and does not impair the object of the present invention. It is to be noted that in the present invention, the term "main chain" means a long-chain portion in which repeating units each having some kind of structure formed by atoms constituting the main chain are bonded together. The main chain may have a branched chain.

An example of such a main chain includes a polymer having a repeating unit represented by the following general formula (XVI):

formula (XVI)

wherein $E^1$ and $E^2$ each independently represent a single bond, —NH—, —O—, —O—CO—, —O—CO—O—, —CO—NH—, —O—CO—NH—, —NH—CO—NH—, —CH=CH—, —C≡C—, —CH=N—, or —N=N—; and G represents an alkylene group having 1 to 12 carbon atoms, —Si—, —$C_6H_4$—, —$C_5H_3N$—, —$C_6H_{10}$—, —$C_{10}H_6$—, —$C_5H_9N$—, —$C_4H_3N$—, —$C_4H_2O$—, —$C_4H_2S$—, Among these main chains, from the viewpoint of ease of introduction of the side chain (a) and, if necessary, the side chain (b) and/or the side chain (c) and stability, a polymer having a repeating unit represented by the general formula (XVI) in which $E^1$ and $E^2$ are each a single bond is preferred. Also, a polymer having a repeating unit represented by the general formula (XVI) in which at least G is an alkylene group is preferred.

Among polymers in which the main chain thereof has an alkylene group and the side chain (a) is bonded to the main chain, a polymer having as a repeating unit (A), at least either a structure represented by the following general formula (V) or a structure represented by the following general formula (VI):

formula (V)

wherein $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group (where $R^4$ and $R^8$ are not simultaneously hydrogen atoms); and $R^5$, $R^6$, and $R^7$ each independently represent a hydrogen atom or a substituent, formula (VI)

wherein $R^3$ represents a hydrogen atom or an alkyl group having 1 to 8 carbon atoms; and A represents a naphthyl group which may have a substituent, an anthranyl group which may have a substituent, or a phenanthrenyl group which may have a substituent (where one or more carbon atoms constituting the naphthyl, anthranyl, or phenanthrenyl group may be substituted by one or more nitrogen atoms).

In such a polymer having the repeating unit (A) represented by the general formula (V), two oxygen atoms are arranged along a direction in which the constituent atoms (carbon atoms) of the main chain to which these oxygen atoms are bonded are oriented. Further, in a case where $R^4$ or/and $R^8$ in the ortho position of the benzene ring is (are) a substituent(s), steric hindrance between the substituent(s) and the oxygen atoms becomes larger so that the substituent(s) in the ortho position is (are) arranged between the two oxygen atoms. This can be regarded as the reason why the planar structure of the benzene ring is arranged in a direction substantially orthogonal to a virtual line obtained by connecting the two oxygen atoms. For the same reason, also in the case of a polymer having the repeating unit (A) represented by the general formula (VI), it can be considered that the planar structure of the condensed ring aromatic group is arranged in a direction substantially orthogonal to a virtual line obtained by connecting the two oxygen atoms.

The repeating units represented by the general formulas (V) and (VI) have the side chains represented by the general formulas (II) and (III), respectively. Therefore, preferred selections of $R^3$ to $R^8$ and A and specific examples of substituents in the general formulas (V) and (VI) are the same as mentioned above with reference to the general formulas (II) and (III). For example, $R^3$ in the general formula (V) is preferably a hydrogen atom. It is also preferred that $R^4$ and $R^8$ in the general formula (V) are each independently a substituent selected from the substituents mentioned above (that is, neither $R^4$ nor $R^8$ is a hydrogen atom). It is to be noted that a repeating unit represented by the general formula (V) in which neither $R^4$ nor $R^8$ is a hydrogen atom is one represented by the general formula (V'). In this case, it is preferred that $R^4$ and $R^8$ are each independently a linear or branched alkyl group having 1 to 4 carbon atoms or halogen such as a chlorine atom. More specifically, a polymer having the repeating unit (A) represented by the general formula (V) in which $R^3$, $R^5$, and $R^7$ are each a hydrogen atom and $R^4$ and $R^8$ are each a methyl group is preferred (it is to be noted that $R^6$ may be either a hydrogen atom or a methyl group, but is preferably a methyl group).

Further, from the viewpoint of improving the reverse wavelength dispersion properties of the retardation film and the solubility of the chain polymer in a solvent used for film forming, a polymer having, in addition to the repeating unit (A), a repeating unit (B) represented by the following general formula (VII) is also preferred:

formula (VII)

Furthermore, from the viewpoint of improving transparency and decreasing a glass transition temperature, a polymer having, in addition to the repeating units (A) and (B), a repeating unit (C) represented by the following general formula (VIII) is also preferred:

formula (VIII)

wherein $R^9$ represents a hydrogen atom or a linear, branched, or cyclic alkyl group having 1 to 12 carbon atoms (where one or more carbon atoms of the alkyl group may be substituted by one or two or more non-adjacent oxygen atoms).

The repeating units (A) and (B) and, if necessary, (C) may be arranged in either block or random fashion. It is to be noted that the chain polymer may have other repeating units in addition to the repeating unit (A) and, if necessary, the repeating unit (B) and the repeating unit (C), as long as the object of the present invention is not impaired.

The chain polymer to be used for forming the retardation film of the present invention is selected from polymers in which the side chain (a) and, if necessary, the side chain (b) and/or the side chain (c) are bonded to the main chain thereof. Further, the chain polymer has the repeating unit (A) and, if necessary, the repeating unit (B) and the repeating unit (C). As described above, examples of the chain polymer to be used for forming the retardation film of the present invention include the various polymers as described above. Among them, a polymer having at least any one of the structures represented by the following general formulas (IX), (X), (XI), and (XII) is most preferred:

formula (IX)

wherein l is 5 to 30 mol %; m is 20 to 80 mol %; and n is 1 to 70 mol %, formula (X)

wherein l is 5 to 30 mol %; m is 20 to 80 mol %; and n is 1 to 70 mol %, formula (XI)

wherein l is 5 to 30 mol %; m is 20 to 80 mol %; and n is 1 to 70 mol %, and formula (XII)

wherein l is 5 to 30 mol %; m is 20 to 60 mol %; n is 20 to 60 mol %; and o is 1 to 55 mol %.

As described above, the retardation film of the present invention is formed from a single-layer film, and therefore has a thickness smaller than that of a conventional retardation film having a laminate structure. Further, the retardation film of the present invention has an in-plane retardation of about λ/2 or λ/4 for light having a wavelength of λ lying within almost the entire visible light wavelength range from 400 to 700 nm, and therefore provides substantially the same form of polarization at any wavelength from 400 to 700 nm. For example, even when white light enters the retardation film of the present invention, the incident white light is not converted to colored polarized light, thereby enabling white polarized light to be obtained. Furthermore, the retardation film of the present invention is excellent in transparency. The chain polymer to be used for forming the retardation film of the present invention exhibits good solubility in a solvent used for film formation, and has a glass transition temperature within an appropriate range, which produces various effects such as improving heat resistance of the retardation film of the present invention and enabling Z drawing.

Next, a method for producing the above-described chain polymer will be described.

A method for producing the polymer to be used for forming the retardation film of the present invention is not particularly limited, and various methods can be employed.

Among various methods, a method in which a raw polymer whose main chain has hydroxyl groups is reacted with specific aromatic aldehyde or aromatic ketone is preferably employed because a polymer in which the side chain (a) is introduced into the main chain thereof can be relatively easily obtained. Particularly, from the viewpoint of stability in introduction of the side chain (a), relatively small wavelength dispersion, and general versatility, the polymer is preferably produced using polyvinyl alcohol. More specifically, the polymer is preferably produced by reacting hydroxyl groups in polyvinyl alcohol used as a raw polymer with specific aromatic aldehyde or aromatic ketone to carry out acetalization (that is, introduction of a structure represented by RCH(OR)(OR)) or ketalization (that is, introduction of a structure represented by RRC(OR)(OR)).

In this regard, it is to be noted that when polyvinyl alcohol is reacted with a specific aromatic aldehyde, an acetal structure is introduced into the main chain thereof as a side chain so that a polymer having a structure represented by the general formula (V) or (VI) in which $R^3$ is a hydrogen atom is obtained. Likewise, when polyvinyl alcohol is reacted with specific aromatic ketone, a ketal structure is introduced into the main chain thereof as a side chain so that a polymer having a structure represented by the general formula (V) or (VI) in which $R^3$ is an alkyl group is obtained.

For example, in order to obtain a polymer having the repeating unit (A) represented by the general formula (V), polyvinyl alcohol is reacted with benzaldehyde or acetophenone having a substituent in at least one ortho position under acid conditions. Specific examples of such benzaldehyde or acetophenone having a substituent in at least one ortho position include 2,4,6-trimethylbenzaldehyde (mesitaldehyde), 2,4,6-triethylbenzaldehyde, 2,6-dimethylbenzaldehyde, 2-methylbenzaldehyde, 2-methylacetophenone, and 2,4-dimethylacetophenone.

Likewise, in order to obtain a polymer having the repeating unit (A) represented by the general formula (VI), polyvinyl alcohol is reacted with condensed ring aromatic aldehyde or condensed ring aromatic ketone. Specific examples of such condensed ring aromatic aldehyde or condensed ring aromatic ketone include substituted 1-naphthoaldehyde, substituted 2-naphthoaldehyde, 9-anthraldehyde, substituted 9-anthraldehyde, and acetonaphthone.

In such a production method, by controlling the amount of aromatic aldehyde or aromatic ketone to be reacted with polyvinyl alcohol, it is possible to obtain a polymer having the repeating unit (A) and the repeating unit (B) because some hydroxyl groups in polyvinyl alcohol are substituted by aromatic groups but other hydroxyl groups remain unsubstituted.

Further, by simultaneously and/or sequentially acetalizing polyvinyl alcohol with aromatic aldehyde or aromatic ketone and a saturated aliphatic aldehyde having 1 to 12 carbon atoms (e.g., propionaldehyde, acetaldehyde), formaldehyde, or alicyclic aldehyde, it is possible to obtain a polymer having the repeating unit (A) and the repeating unit (C). In this case, by further controlling the amount of aromatic aldehyde or aromatic ketone to be reacted with polyvinyl alcohol and the amount of saturated aliphatic aldehyde, formaldehyde, or alicyclic aldehyde to be reacted with polyvinyl alcohol, it is possible to obtain a polymer having the repeating units (A) to (C) because some hydroxyl groups remain unsubstituted.

The degree of polymerization of the polymer is not particularly limited as long as it is at a level suitably used for, for example, a retardation film. However, from the viewpoint of achieving film strength high enough to withstand drawing, the degree of polymerization of the polymer is preferably in the range of about 100 to 20,000, more preferably in the range of about 500 to 10,000. The degree of polymerization of the polymer can be controlled by appropriately changing the kind of main chain of the polymer or changing the kind or amount of the side chain (a) and the like.

The glass transition temperature of the polymer varies depending on the kind of main chain of the polymer or the kind or amount of each of the side chains (a) to (c), but is in the range of, for example, about 80 to 180° C. Therefore, the polymer having such a glass transition temperature has heat resistance high enough to use as a retardation film. Further, unlike a conventional polymer having a high glass transition temperature exceeding about 200° C., the polymer of the present invention has an appropriate glass transition temperature, and therefore can be subjected to not only uniaxial drawing but also Z drawing according to a conventionally known method.

Next, a method for forming a film of the polymer to obtain a retardation film will be described.

In this regard, it is to be noted that in this specification, the term "film" includes one generally called "sheet".

The retardation film of the present invention consists of a single-layer film formed of the polymer described above. A method for forming such a film is not particularly limited, and therefore the polymer can be formed into a film by, for example, a casting method, a melt extrusion method, or a calender method. Among these methods, from the viewpoint of obtaining an optically uniform film with higher thickness accuracy, a casting method is preferably employed.

A casting method usually uses a solvent for dissolving the polymer. In connection with this, there is a case where the polymer of the present invention having a hydroxyl group as a side chain (b) exhibits good solubility in a solvent which cannot be used when a conventional retardation film comprising a polymer film is formed by a casting method. Examples of such a solvent for dissolving the polymer of the present invention include tetrahydrofuran, dimethylsulfoxide, N,N-dimethylformamide, N,N-dimethylacetamide, N-methylpyrrolidone, cyclopentanone, cyclohexanone, methyl ethyl ketone, ethyl acetate, dichloromethane, and toluene. It is to be noted that, if necessary, the solvent may be heated for dissolving the polymer therein.

By drawing the thus obtained film, it is possible to obtain a retardation film of the present invention. Examples of a drawing method include, but are not limited to, conventional uniaxial drawing methods such as tenter drawing, inter-roll drawing, and inter-roll compression drawing; and conventional biaxial drawing methods such as simultaneous biaxial drawing using a whole tenter technique and successive biaxial drawing using a roll tenter technique.

Among biaxial drawing methods, Z drawing can also be carried out in the present invention depending on the kind (characteristics) of a polymer to be used for forming a film. Z drawing can be carried out by, for example, a conventional Z drawing method such that drawing stress is generated in a thickness direction (that is, in the Z-axis direction) by shrinking a film in a direction (that is, in the Y-axis direction) that is orthogonal to or is intersecting with the direction of heat drawing of the film (that is, to or with the X-axis direction).

It is to be noted that for the purpose of improving the drawing property of the film, the film may contain one or more plasticizers such as phthalic esters (e.g., dimethyl phthalate, diethyl phthalate, dibutyl phthalate); phosphoric esters (e.g., trimethyl phosphate, triethyl phosphate, triphenyl phosphate); and fatty acid esters (e.g., diethyl adipate, dibutyl fumarate). The amount of the plasticizer to be added to the film is preferably about 1 to 20 parts by weight with respect to 100 parts by weight of the polymer in view of the effect of improving drawing property and the influence of the plasticizer on wavelength dispersion of a resultant retardation film. In addition to such plasticizers, other additives such as antioxidants and ultraviolet absorbers may be appropriately added to the film in accordance with the intended use of the film.

The conditions for drawing the film, such as temperature and drawing ratio vary depending on the kind of main chain constituting the polymer, the kind or amount of the side chain (a), and the kind or amount of the side chain (b) and/or the side chain (c) introduced into the main chain if necessary, and are therefore appropriately determined. However, for example, the drawing temperature is preferably about 50 to 200° C., and the drawing ratio is preferably about 1.1 to 4.0 times. The thus obtained retardation film of the present invention has excellent transparency because the visible light transmittance and haze value thereof measured in accordance with JIS K 7105 are about 88 to 93% and about 0.1 to 3%, respectively. Further, the thickness of the retardation film is sufficiently small because it is usually in the range of about 20 to 200 µm, preferably in the range of about 40 to 100 µm.

As described above, the retardation film of the present invention consists of a single-layer film of the chain polymer having the side chain (a), and exhibits reverse wavelength dispersion characteristics. Such a retardation film can exhibit, by itself, wavelength dispersion characteristics such that retardation for light having a wavelength of $\lambda$ lying within almost the entire visible light wavelength range is, for example, about $\lambda/2$ or $\lambda/4$, thereby enabling conversion to white polarized light. As described above, the retardation film of the present invention has reverse wavelength dispersion characteristics. Although the wavelength dispersion of the retardation film of the present invention varies depending on the kind of main chain constituting a polymeric material of the film, the kind or amount of the side chain (a), and the kind or amount of the side chain (b) introduced into the main chain if necessary, when retardations are measured under the following conditions, they roughly satisfy the relation: $Re(450)/Re(550) \leq 0.97$, $Re(650)/Re(550) \geq 1.01$. Here, $Re(450)$, $Re(550)$, and $Re(650)$ represent in-plane retardations measured at wavelengths 450, 550 and 650 nm, respectively.

In a case where the retardation film of the present invention comprises a film obtained by, for example, uniaxial drawing, the refractive indexes of the film satisfy the relation represented by the formula: $nx > ny = nz$, where $nx$, $ny$, and $nz$ represent a refractive index in the direction of drawing (that is, in the direction of the X-axis (in a direction such that an in-plane refractive index is greatest), a refractive index in a direction orthogonal to the drawing direction (that is, in the direction of the Y-axis), and a refractive index in the direction of a thickness (that is, in the direction of the Z-axis), respectively. On the other hand, in a case where the retardation film of the present invention is obtained by the Z drawing described above among various biaxial drawing methods, the refractive indexes of the retardation film satisfy the relation represented by the formula: $nx > nz > ny$. Meanwhile, as a parameter of visual characteristics, a value Nz represented by the formula: $Nz = (nx-nz)/(nx-ny)$ is often used. When the value Nz is 0.5, retardation is not changed according to an angle of inclination even in a case where the retardation film is inclined in the direction of a slow axis (that is, in the direction of the X-axis). That is, it has become apparent that by setting the value Nz to 0.5, it is possible to remove the viewing angle dependence of retardation. From the viewpoint of improving visual characteristics, it is desired that drawing of the film is carried out while paying particular attention to the control of three dimensional refractive indexes.

When light having a certain wavelength enters the retardation film of the present invention, a refractive index difference $n_e-n_o$ ($n_e$ represents an extraordinary index and $n_o$ represents an ordinary index) is 0.005 or less at 550 nm (hereinafter, $n_e-n_o$ is simply referred to as "$\Delta n$"). However, in a case where a film formed using a mixture of the chain polymer of the present invention and a liquid crystalline compound is used as a retardation film, the value of $\Delta n$ of the retardation film can be made 0.01 or more because a film itself formed of a liquid crystalline compound generally has a relatively high value of $\Delta n$.

When the value of $\Delta n$ of the retardation film is high, it becomes possible to decrease the thickness of the retardation film while achieving a desired retardation. Particularly, it is possible to obtain a retardation film which has a thickness of 100 μm or less and gives a retardation of $\lambda/2$ to light having any wavelength lying within almost the entire visible light wavelength range.

The liquid crystalline compound is not particularly limited as long as the object of the present invention is not impaired. Examples of such a liquid crystalline compound include liquid crystalline low molecular weight compounds such as azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles; and liquid crystalline monomers obtained by introducing a polymerizable group such as a (meth)acryloyloxy group, an epoxy group, a vinyloxy group, a propargyl group, or an isocyanate group into the molecular end of the above-mentioned liquid crystalline low molecular weight compounds. Among these liquid crystalline compounds, one or more of them are appropriately selected so that a retardation film having a desired value of $\Delta n$ can be obtained or according to the kind of polymer to be used. From the viewpoint of sufficiently exhibiting the effect of increasing the value of $\Delta n$, the amount of the liquid crystalline compound to be used is preferably 1 part by weight or more, more preferably 3 parts by weight or more, with respect to 100 parts by weight of the chain polymer. Further, from the viewpoint of maintaining the characteristics such that retardation is larger at a longer wavelength, the amount of the liquid crystalline compound to be used is preferably 20 parts by weight or less, more preferably 10 parts by weight or less, with respect to 100 parts by weight of the chain polymer.

The retardation film of the present invention can be used as an optical film by laminating it with other optical materials. For example, a laminate film obtained by laminating the retardation film of the present invention to a polarizing plate can be used as an optical film such as an elliptically polarizing plate or a circularly polarizing plate. Further, it is possible to laminate the retardation film of the present invention adjusted to have a retardation of $\lambda/4$ and the retardation film of the present invention adjusted to have a retardation of $\lambda/2$ to a polarizing plate to obtain an optical film. The retardation film of the present invention can be directly laminated to a polarizer of a polarizing plate or can be laminated to a polarizer of a polarizing plate through a protective film. On the surface of the retardation film of the present invention, it is possible to provide a pressure-sensitive adhesive layer with which the retardation film is adhered to other components such as a liquid crystal cell. In a case where the surface of the pressure-sensitive adhesive layer is exposed, the pressure-sensitive adhesive layer is preferably covered with a release sheet. As described above, by laminating the retardation film of the present invention with other optical materials having different functions, it is possible to obtain various optical films such as an optical film in which a polarizing plate, the retardation film of the present invention, and a band-pass filter are laminated in this order and an optical film having a protective film on its surface.

The retardation film of the present invention or the optical film having a laminate structure comprising the retardation film of the present invention can be suitably used as a structural component of various image display devices such as liquid crystal displays. For example, in the case of a liquid crystal display, the optical film is provided on one surface or both surfaces of a liquid crystal cell, and the type of such a liquid crystal display can be appropriately selected from, for example, conventional transmissive, reflective, and transflective types. Therefore, the liquid crystal display can be formed from any liquid crystal cell. For example, a liquid crystal cell of a passive matrix driving type typified by a liquid crystal cell of a thin film transistor type can also be used. In a case where the optical film of the present invention is provided on both surfaces of a liquid crystal cell, the optical films are the same or different. Further, when the liquid crystal display is manufactured, one or more sheet materials such as a prism array sheet, a lens array sheet, a diffuser, and a backlight can be arranged at their appropriate positions.

EXAMPLES

Hereinbelow, the retardation film of the present invention will be described in more detail with reference to the following Examples. However, the present invention is not limited thereto.

Conditions for measuring various properties of polymers and retardation films are as follows.

(Measurement of Composition Ratio)

200 mg of a polymer as a measuring object was sampled, and the polymer, 0.93 g of imidazole and 1.37 g of t-butyldimethylchlorosilane were added to 10 mL of THF at room temperature under nitrogen, and they were stirred at room temperature for 12 hours. After the completion of the reaction, the reaction mixture was purified by reprecipitation three times with methanol. The thus obtained polymer was analyzed by $^1$H-NMR (CDC13 solvent).

In Production Examples 1 and 2, the composition ratio of an obtained polymer was determined from peaks appearing at around 0 ppm, 0.8 ppm, and 6.8 ppm.

In Production Example 3, the composition ratio of an obtained polymer was determined from peaks appearing at around 0 ppm, 3.3-5.4 ppm, and 6.8 ppm.

In Production Example 4, the composition ratio of an obtained polymer was determined from peaks appearing at around 0 ppm, 3.5-5.0 ppm, and 6.8 ppm.

(Measurement of Glass Transition Temperature)

The glass transition temperature of a polymer was measured using a differential scanning thermometer (manufactured by SEIKO under the trade name of "DSC6200"). Measurement was carried out by increasing the temperature of a powder sample of the polymer at a rate of 10° C./min from room temperature while flowing nitrogen gas at 80 mL/min.

The measurement was carried out twice, and measured data obtained for the second time was used. In each measurement, the amount of the powder sample used was 3 mg. The temperature calibration of the thermometer was carried out using reference materials (indium and tin).

(Rate of Retardation Change)

A sample film was placed in a dryer set at 80° C. for 10 hours, and then the retardation of the sample film was measured. The rate of retardation change was determined from the retardation of the sample film measured prior to this test and the retardation of the sample film measured after the treatment at 80° C. for 10 hours.

(Measurement of IN-Plane Retardation)

The in-plane retardation of a sample film was measured using "KOBRA21-ADH" manufactured by Oji Scientific Instruments.

(Measurement of Thickness)

The thickness of a sample film was measured using a micrometer (manufactured by MITUTOYO).

(Measurement of Water Absorption)

The water absorption of a sample film was measured in accordance with JIS K 7209 "Testing Methods for Water and Boiling Water Absorption of Plastics". The sample film had a size of 50 mm×50 mm and a thickness of 40 to 100 μm.

(Analysis by Polarized IR)

A sample film was analyzed by polarized IR at room temperature with the use of FT/IR-230 (manufactured by JASCO Corporation) equipped with PL-82 as an IR polarizer.

Production Example 1

5.0 g of PVA with a degree of polymerization of 1800 (manufactured by Nippon Synthetic Chemical Industry under the trade name of "NH-18") dried at 105° C. for 2 hours was dissolved in 95 mL of DMSO. Then, 3.78 g of mesitaldehyde, 1.81 g of propionaldehyde, and 1.77 g of p-toluenesulfonic acid monohydrate were added thereto, and they were stirred at 40° C. for 4 hours. Reprecipitation was carried out using a water/methanol mixture (water/methanol=2/1) in which 2.35 g of sodium bicarbonate was dissolved. The reprecipitated polymer was separated by filtration, and was then dissolved in THF. Then, reprecipitation was carried out using diethyl ether. The reprecipitated polymer was separated by filtration and dried. As a result, 7.89 g of a white polymer was obtained. The thus obtained polymer was analyzed under the measurement conditions described above. As a result, it was found that the polymer was a novel polymer having a structure represented by the formula (IX) in which the ratio between the units of vinylmesital, vinylpropional, and vinylalcohol was 22:46:32. The glass transition temperature of the polymer was 102° C.

Example 1

The polymer obtained in the Production Example 1 was dissolved in DMF, and was then formed into a film with the use of an applicator and dried. The dried film was drawn to 1.8 times at 110° C. using a drawing machine, and as a result, a uniaxially-drawn film having a thickness of 85 μm was obtained. The thus obtained drawn film had reverse wavelength dispersion characteristics such that Re(450), Re(550), and Re(650) were 116.4 nm, 138.1 nm, and 147.6 nm, respectively. The rate of retardation change of the film was measured to evaluate heat resistance, and was found to be 1% or less. The water absorption of the film was 5%.

Production Example 2

A polymer was produced in the same manner as in the Production Example 1 except that the amount of mesitaldehyde was changed to 2.10 g and that the amount of propionaldehyde was changed to 2.47 g. The thus obtained polymer was purified, and as a result, 6.48 g of a white polymer whose ratio between the units of vinylmesital, vinylpropional, and vinylalcohol was 18:52:30 was obtained. The glass transition temperature of the polymer was 97° C.

Example 2

The polymer obtained in the Production Example 2 was dissolved in DMF, and was then formed into a film with the use of an applicator and dried. The dried film was drawn to 2 times at 110° C. using a drawing machine, and as a result, a uniaxially-drawn film having a thickness of 78 μm was obtained. The thus obtained drawn film had reverse wavelength dispersion characteristics such that Re(450), Re(550), and Re(650) were 263.9 nm, 276.8 nm, and 280.6 nm, respectively. The rate of retardation change of the film was measured to evaluate heat resistance, and was found to be 1% or less. The water absorption of the film was 5%.

Figure 1:
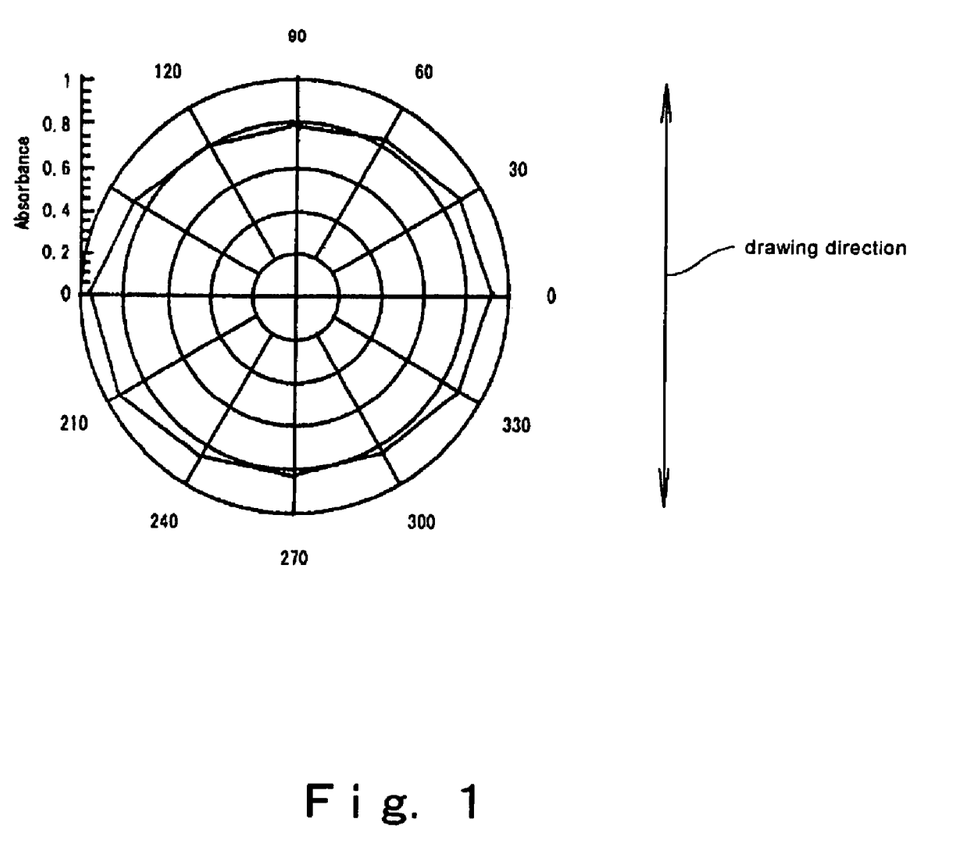
FIG. 1 is a graph which shows a result of measurement by polarized IR.

Further, the drawn film was analyzed by polarized IR. FIG. 1 shows a result of plotting the relation between the angle which the polarization direction forms with a fast axis and the intensity of an absorption peak at 1465 cm$^{-1}$ due to aromatic C=C stretching vibration. As shown in FIG. 1, when the angle which the polarization direction formed with a fast axis was 0° or 180°, the absorption peak intensity was increased. On the other hand, when the angle which the polarization direction formed with a fast axis was 90° or 270°, the absorption peak intensity was decreased. This result indicates that the aromatic ring of the polymer is oriented so as to be orthogonal to a plane containing a main chain of the polymer.

Production Example 3

A polymer was produced in the same manner as in the Production Example 1 except that the amount of mesitaldehyde was changed to 3.03 g and that propionaldehyde was replaced with 4.30 g of 1,1-diethoxyethane. The thus obtained polymer was purified, and as a result, 7.24 g of a white polymer was obtained. The thus obtained polymer was analyzed under the measurement conditions described above. As a result, it was found that the polymer was a novel polymer having a structure represented by the formula (X) in which the ratio between the units of vinylmesital, vinylacetal, and vinylalcohol was 18:47:35. The glass transition temperature of the polymer was 120° C.

Example 3

The polymer obtained in the Production Example 3 was dissolved in DMF, and was then formed into a film with the use of an applicator and dried. The dried film was drawn to 2 times at 155° C. using a drawing machine, and as a result, a uniaxially-drawn film having a thickness of 110 μm was obtained. The thus obtained drawn film had reverse wavelength dispersion characteristics such that Re(450), Re(550), and Re(650) were 246.7 nm, 274.1 nm, and 283.7 nm, respectively. The rate of retardation change of the film was measured to evaluate heat resistance, and was found to be 1% or less. The water absorption of the film was 8%.

Production Example 4

8.8 g of the same PVA as used in the Production Example 1 was dissolved in 500 mL of DMSO. Then, 3.0 g of mesitaldehyde, 9.0 g of cyclohexanecarboxyaldehyde, and 3.1 g of p-toluenesulfonic acid monohydrate were added thereto, and they were stirred at 40° C. for 4 hours. Then, a 1N aqueous sodium hydroxide solution was added to the reaction mixture to terminate the reaction. Reprecipitation was carried out using water. The reprecipitated polymer was separated by filtration, and was then dissolved in DMF. Then, reprecipitation was carried out using diethyl ether. The reprecipitated polymer was separated by filtration and dried. As a result, a white polymer was obtained. The thus obtained polymer was analyzed by $^1$H-NMR under the conditions described above, and as a result, it was found that mesitaldehyde and cyclohexanecarboxyaldehyde were introduced into the PVA in the form of acetals, and that the polymer was a novel polymer having a structure represented by the general formula (XI) in which the ratio between the units of vinylmesital, vinylcyclohexanecarboxal, and vinylalcohol was 10:39:51. The glass transition temperature of the polymer was 107° C.

Example 4

The polymer obtained in the Production Example 4 was dissolved in DMF, and was then formed into a film with the use of an applicator and dried. The dried film was drawn to 1.5 times at 150° C. using a drawing machine, and as a result, a uniaxially-drawn film was obtained. The thus obtained drawn film had reverse wavelength dispersion characteristics such that Re(450)/Re(550) and Re(650)/Re(550) were 0.934 and 1.032, respectively.

Comparative Example 1

A polymer was produced in the same manner as in the Production Example 1 except that mesitaldehyde was replaced with 2.71 g of benzaldehyde. The thus obtained polymer was purified, and as a result 6.02 g of a white polymer was obtained. In the same manner as in the Example 1, the polymer was formed into a film, and the film was drawn. The wavelength dispersion characteristics of the drawn film were determined, and as a result, it was found that the film had wavelength dispersion characteristics such that Re(450), Re(550), and Re(650) were 140.5 nm, 140.1 nm, and 139.5 nm, respectively and Re(450)/Re(550) and Re(650)/Re(550) were 1.003 and 0.996, respectively. That is, the film did not have reverse wavelength dispersion characteristics

The invention claimed is:

1. A retardation film consisting of a single-layer film in which a birefringent chain polymer is oriented, the polymer having as a side chain (a), a group represented by the following general formula (I), the retardation film having a smaller in-plane retardation at a shorter wavelength lying within a range of at least 450 to 650 nm, and having a larger in-plane retardation at a longer wavelength relative to the shorter wavelength lying within a range of at least 450 to 650 nm:

formula (I)

wherein two oxygen atoms are bonded to atoms constituting a main chain, respectively;

and $R^1$ and $R^2$ each independently represent a hydrogen atom, an alkyl group having 1 to 8 carbon atoms, or an aromatic group, and wherein at least either $R^1$ or $R^2$ is an aromatic group, and the aromatic group(s) represented by $R^1$ or/and $R^2$ is (are) arranged in a direction such that the planar structure thereof is substantially orthogonal to a virtual line obtained by connecting the two oxygen atoms.

2. A retardation film consisting of a single-layer film in which a birefringent chain polymer is oriented, the polymer having as a side chain (a), at least either a group represented by the following general formula (II) or a group represented by the following general formula (III), the retardation film having a smaller in-plane retardation at a shorter wavelength lying within a range of at least 450 to 650 nm, and having a larger in-plane retardation at a longer wavelength relative to the shorter wavelength lying within a range of at least 450 to 650 nm:

formula (II)

wherein two oxygen atoms are bonded to atoms constituting a main chain, respectively; $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group where $R^4$ and $R^8$ are not simultaneously hydrogen atoms; and $R^5$, $R^6$, and $R^7$ each independently represent a hydrogen atom or a substituent, and is arranged in a direction such that the planar structure thereof is substantially orthogonal to a virtual line obtained by connecting the two oxygen atoms, formula (III)

wherein two oxygen atoms are bonded to atoms constituting a main chain, respectively;

$R^3$ represents a hydrogen atom or an alkyl group having 1 to 8 carbon atoms; and A represents a naphthyl group which may have a substituent, an anthranyl group which may have a substituent, or a phenanthrenyl group which may have a substituent where one or more carbon atoms constituting the naphthyl, anthranyl, or phenanthrenyl group may be substituted by one or more nitrogen atoms.

3. The retardation film according to claim 1 or 2, wherein the polymer has a part where structural units each having a structure, in which the side chain (a) is bonded to constituent atoms of the main chain thereof, are adjacent to each other.

4. The retardation film according to claim 1 or 2, wherein the amount of the side chain (a) contained in the polymer is 1 to 50 mol % with respect to the total amount of side chains of the polymer.

5. The retardation film according to claim 1 or 2, wherein the polymer has, in addition to the side chain (a), a hydroxyl group as a side chain (b). 450 to 650 nm:

formula (V)

wherein $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxyl group having 1 to 4 carbon atoms, a linear or branched thioalkoxyl group having 1 to 4 carbon atoms, halogen, a nitro group, an amino group, a hydroxyl group, or a thiol group where $R^4$ and $R^8$ are not simultaneously hydrogen atoms; and $R^5$, $R^6$, and $R^7$ each independently represent a hydrogen atom or a substituent, and is arranged in a direction such that the planar structure thereof is substantially orthogonal to a virtual line obtained by connecting the two oxygen atoms, formula (VI)

wherein $R^3$ represents a hydrogen atom or an alkyl group having 1 to 8 carbon atoms; and A represents a naphthyl group which may have a substituent, an anthranyl group which may have a substituent, or a phenanthrenyl group which may have a substituent where one or more carbon atoms constituting the naphthyl, anthranyl, or phenanthrenyl group may be substituted by one or more nitrogen atoms.

6. The retardation film according to claim 5, wherein the polymer has, in addition to the side chains (a) and (b), a group represented by the following general formula (IV) as a side chain (c):

formula (IV)

wherein $R^9$ represents a hydrogen atom or a linear, branched or cyclic alkyl group where one or more carbon atoms of the alkyl group may be substituted by one or two or more non-adjacent oxygen atoms.

7. The retardation film according to claim 6, wherein the amount of the side chain (a), the amount of the side chain (b), and the amount of the side chain (c) contained in the polymer are 1 to 50 mol %, 5 to 95 mol %, and 1 to 90 mol %, respectively, with respect to the total amount of side chains of the polymer.

8. A retardation film consisting of a single-layer film in which a birefringent chain polymer is oriented, the polymer having as a repeating unit (A), at least either a structure represented by the following general formula (V) or a structure represented by the following general formula (VI), the retardation film having a smaller in-plane retardation at a shorter wavelength lying within a range of at least 450 to 650 nm, and having a larger in-plane retardation at a longer wavelength relative to the shorter wavelength lying within a range of at least.

9. The retardation film according to claim 8, wherein the repeating unit (A) of the polymer is obtained by acetalization of hydroxyl groups of polyvinyl alcohol with aromatic aldehyde.

10. The retardation film according to claim 8, wherein the polymer has, in addition to the repeating unit (A), a repeating unit (B) represented by the following general formula (VII), and wherein the repeating units (A) and (B) may be arranged in either block or random fashion:

formula (VII)

11. The retardation film according to claim 10, wherein the polymer has, in addition to the repeating units (A) and (B), a repeating unit (C) represented by the following general formula (VIII), and wherein the repeating units (A) to (C) may be arranged in either block or random fashion:

formula (VIII)

wherein $R^9$ represents a hydrogen atom or a linear, branched, or cyclic alkyl group having 1 to 12 carbon atoms where one or more carbon atoms of the alkyl group may be substituted by one or two or more non-adjacent oxygen atoms.

12. A retardation film consisting of a single-layer film in which a birefringent chain polymer is oriented, the polymer having a structure represented by the following general formula (IX), the retardation film having a smaller in-plane retardation at a shorter wavelength lying within a range of at least 450 to 650 nm, and having a larger in-plane retardation at a longer wavelength relative to the shorter wavelength lying within a range of at least 450 to 650 nm:

formula (IX)

wherein l is 5 to 30 mol %, m is 20 to 80 mol %, and n is 1 to 70 mol %.

13. A retardation film consisting of a single-layer film in which a birefringent chain polymer is oriented, the polymer having a structure represented by the following general formula (X), the retardation film having a smaller in-plane retardation at a shorter wavelength lying within a range of at least 450 to 650 nm, and having a larger in-plane retardation at a longer wavelength relative to the shorter wavelength lying within a range of at least 450 to 650 nm:

formula (X)

wherein l is 5 to 30 mol %, m is 20 to 80 mol %, and n is 1 to 70 mol %.

14. A polymer represented by the following general formula (XII):

formula (XII)

wherein l is 5 to 30 mol %, m is 20 to 60 mol %, n is 20 to 60 mol %, and o is 1 to 55 mol %.

15. An optical film having a laminate structure comprising the retardation film according to any one of claims 1, 2, 8, 12, and 13.

16. An image display device comprising the optical film according to claim 15.

17. An image display device comprising the retardation film according to any one of claims 1, 2, 8, 12, and 13.

* * * * *